(12) United States Patent
Hardi

(10) Patent No.: US 9,418,639 B2
(45) Date of Patent: Aug. 16, 2016

(54) SMART DRUMSTICKS

(71) Applicant: Muzik LLC, Miami Beach, FL (US)

(72) Inventor: Jason Hardi, Miami Beach, FL (US)

(73) Assignee: MUZIK LLC, Miami Beach, FL (US)

( * ) Notice: Subject to any disclaimer, the term of this patent is extended or adjusted under 35 U.S.C. 154(b) by 0 days.

(21) Appl. No.: 14/591,221

(22) Filed: Jan. 7, 2015

(65) Prior Publication Data

US 2016/0196813 A1 Jul. 7, 2016

(51) Int. Cl.
*G10H 1/00* (2006.01)
*H05B 37/02* (2006.01)
*G10H 7/00* (2006.01)

(52) U.S. Cl.
CPC ............... *G10H 1/0008* (2013.01); *G10H 7/00* (2013.01); *H05B 37/02* (2013.01)

(58) Field of Classification Search
CPC .................. G10H 2220/185; G10H 2220/201; G10H 2220/401; G10H 1/0008; G10H 7/00; H05B 37/02
USPC .......................................................... 84/600
See application file for complete search history.

(56) References Cited

U.S. PATENT DOCUMENTS

| | | | | | |
|---|---|---|---|---|---|
| 4,722,035 | A | * | 1/1988 | Rapisarda | 362/109 |
| 5,177,311 | A | * | 1/1993 | Suzuki et al. | 84/600 |
| 5,179,237 | A | * | 1/1993 | Grossman | 84/422.4 |
| 9,018,508 | B2 | * | 4/2015 | Sakurai et al. | 84/723 |
| 2011/0260968 | A1 | * | 10/2011 | Ye et al. | 345/158 |
| 2012/0006181 | A1 | * | 1/2012 | Harada et al. | 84/600 |
| 2012/0206330 | A1 | * | 8/2012 | Cao et al. | 345/156 |
| 2013/0053146 | A1 | * | 2/2013 | Ikeda et al. | 463/37 |
| 2013/0118339 | A1 | * | 5/2013 | Lee et al. | 84/725 |
| 2013/0152768 | A1 | * | 6/2013 | Rapp | 84/634 |
| 2013/0239782 | A1 | * | 9/2013 | Yoshihama | 84/609 |
| 2013/0239783 | A1 | * | 9/2013 | Tabata et al. | 84/609 |
| 2013/0239784 | A1 | * | 9/2013 | Tabata | 84/609 |
| 2013/0239785 | A1 | * | 9/2013 | Tabata | 84/609 |
| 2013/0262024 | A1 | * | 10/2013 | Sakurai et al. | 702/150 |

* cited by examiner

*Primary Examiner* — Jeffrey Donels
(74) *Attorney, Agent, or Firm* — Perkins Coie LLP

(57) ABSTRACT

Embodiments of a smart drumstick, a device interacting with the drumstick, and related methods are disclosed. Some embodiments include a computer-readable storage medium whose contents are capable of causing a computing system to perform a method of managing data related to lighting and motion for a device having a drumstick shape, the method comprising: identifying a light signal corresponding to a given type of motion; sending a definition of the determined light signal to the device; receiving a description of a type of motion of the device; determining whether the given type of motion matches the type of motion of the device; and transmitting the determination result to the device.

23 Claims, 7 Drawing Sheets

SMART DRUMSTICKS

TECHNICAL FIELD

The present application is generally related to interactive devices and more specifically to embodiments of interactive wireless drumsticks or other musical instruments.

BACKGROUND

Musicians and other users create music by playing or otherwise interacting with musical instruments. In some cases as the instrument is played the musician creates a note or beat. In other instances, the musician can follow along with recorded music in order to practice or perfect technique. More recently, interactive musical gaming has gained in popularity. For example, users can play a virtual instrument and mimic popular music recordings. A drum set or other percussion instruments would benefit from interactivity with a digital source. But a drum set or kit can be costly and space-consuming. It would be beneficial to be able to play drums, learn about playing drums, compose drum music, or otherwise work with drums in a simulated environment. Moreover, it would be beneficial to provide visual or tactile cues while a musician plays a drum or percussion instrument.

SUMMARY

Implementations and embodiments of the present invention include an interactive drum stick comprising a processor for controlling a lighting display in the shaft or tip of the drumstick. The lighting display may be responsive to the motion of the drumstick or to cues or beats within music played and detected by the drumstick.

In one example embodiment, a device having a drumstick shape is disclosed. The device comprises a lighting display and a motion detector, where the motion detector detects a plurality of types of motion of the device, and the lighting display shows a plurality of light signals respectively corresponding to the plurality of types of motion.

In one example embodiment, a method of operating a device having a drumstick shape comprising a lighting display and a motion detector, and a processor is disclosed. The method comprises displaying, by the lighting display, a light signal corresponding to a first type of motion. The method also comprises detecting, by the motion detector, a second type of motion of the device after the displaying, and determining, by the processor, whether the first type of motion matches the second type of motion corresponding to the displayed light signal. In addition, the method comprises updating, by the processor, a score based on the determination result.

In one example embodiment, a method of operating a device having a drumstick shape comprising a lighting display a motion detector, and a processor is disclosed. The method comprises detecting, by the motion detector, a type of motion of the device. The method also comprises determining, by the processor, a light signal corresponding to the detected type of motion, and displaying, by the lighting display, the determined light signal. In addition, the method comprises recording, by the processor, a description of the detected type of motion.

In one example embodiment, a computer-readable storage medium whose contents are capable of causing a computing system to perform a method of managing data related to lighting and motion for a device having a drumstick shape is disclosed. The method comprises identifying a light signal corresponding to a given type of motion. The method also comprises sending a definition of the determined light signal to the device, and receiving a description of a type of motion of the device. Furthermore, the method comprises determining whether the given type of motion matches the type of motion of the device, and transmitting the determination result to the device.

In one example embodiment, a system for managing data related to lighting and motion for a device is disclosed. The system comprises a processor and memory, cooperating to function as a receiving unit configured to receive a description of a type of motion of the device; a recording unit configured to record the description of the type of motion of the device; an identifying unit configured to identify a light signal corresponding to the type of motion of the device; and a sending unit configured to send a description of the identified light signal to the device.

Various example embodiments of the present invention include one or more of the following features. The device further comprises a processor and a memory, where the processor and the memory maintain a correspondence between the plurality of types of motion and the plurality of light signals. Furthermore, the motion detector detects a type of motion of the device, the processor determines a drumbeat corresponding to the detected type of motion, and the speaker plays the determined drumbeat. In addition, the processor receives a MIDI command through a network interface, the processor generates an instrumental sound for the MIDI command, and the speaker plays the instrumental sound. The device further comprises a speaker that transmits a plurality of drumbeats respectively corresponding to the plurality types of motion, where the speaker further transmits music, including a human voice or an instrumental sound. The lighting display is a light emitting diode (LED) display located in a portion of the device corresponding to a tip of the drumstick. The motion detector includes a nine-axis inertia measurement unit (IMU). A type of motion includes a set of displacements, directions, speeds, or accelerations. A type of motion corresponds to a drum stroke on a drum element. The device may further comprise a system or method of vibratory, pressure or other haptic feedback to the user to indicate a drum strike. A portion of the device corresponding to a shaft of the drumstick is covered with a metal grip. The device further comprises a processor, where the processor determines a light signal corresponding to a given type of motion, the lighting display shows the determined light signal, the motion detector detects a type of motion after the showing, and the processor determines whether the given type of motion matches the detected type of motion. Furthermore, the memory records the detected type of motion into the memory. The device further comprises a processor, where the motion detector detects a type of motion of the device, the processor determines the light signal corresponding to the detected type of motion, and the lighting display shows the determined light signal. The device further comprises one or more operable controls, where one of the operable controls causes transmission of a music instrument digital interface (MIDI) command to another device via a network interface. Furthermore, the one or more operable controls are buttons, and the network interface is a short-range wireless interface or a wired interface. The device further comprises a processor, where wherein the motion detector detects a type of motion of the device, the processor generates a MIDI command for a detected type of motion, and the processor transmits the generated MIDI command to another device via a network interface. The device further includes a speaker, and the method further comprises determining, by the processor, a drumbeat corresponding to the second type of motion and playing, by the speaker, the determined drumbeat. The device further includes a memory, and the method further comprises determining, by the processor, the first type of motion before the displaying based on a drum transcription stored in the memory. The method further comprises receiving, by the processor, a drum transcription from another device through a network interface, and determining, by the processor, the type of motion before the displaying based on the received drum transcription. The device may further include a speaker, and methods may further comprise determining, by the processor, a drumbeat corresponding to the detected type of motion, transmitting, by the speaker, the determined drumbeat, and recording, by the processor, a description of the drumbeat. The method further comprises translating, by the processor, the detected type of motion into a drum stroke on a drum element, generating, by the processor, a MIDI command related to the drum stroke and the drum element, and transmitting, by the processor, the generated MIDI command to another device.

In some embodiments a smartphone, tablet or other computing device interprets the motion data received from the drumsticks and maps such motion data to specific sounds associated with various instruments or play features. In various embodiments, relative position of the drum stick may be determined based on a coordinate system centered on the user, such that drum strikes may be associated with relative position to the user. In some embodiments, the motion detection and wireless transmission features described herein may be incorporated into other devices including but not limited to foot pedals, foot straps, string instrument bows, guitar necks and guitar faces, wrist or arm bands or other devices.

Embodiments of the present invention may provide one or more of the following advantages. A musician or any user can play drums without access to a drum set or kit, which can be costly or space-consuming. The drumstick allows a user to learn how to play drums through lighting or other signals, thereby providing added entertainment value than plain notes in a drum transcription. The user can also compose drum music while enjoying a light display corresponding to the intended drum notes, which offers visual signals to reinforce confirmation of the user's composition. In addition, the user can play drums together with recorded or real-time sounds of other instruments, simply by operating the drumstick. Furthermore, while the drumstick can be used alone, it can also be used as a regular drumstick to play drums.

BRIEF DESCRIPTION OF THE DRAWINGS

Various embodiments are disclosed in the following detailed description and accompanying drawings.

DETAILED DESCRIPTION

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and the equivalent.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Figure 1:
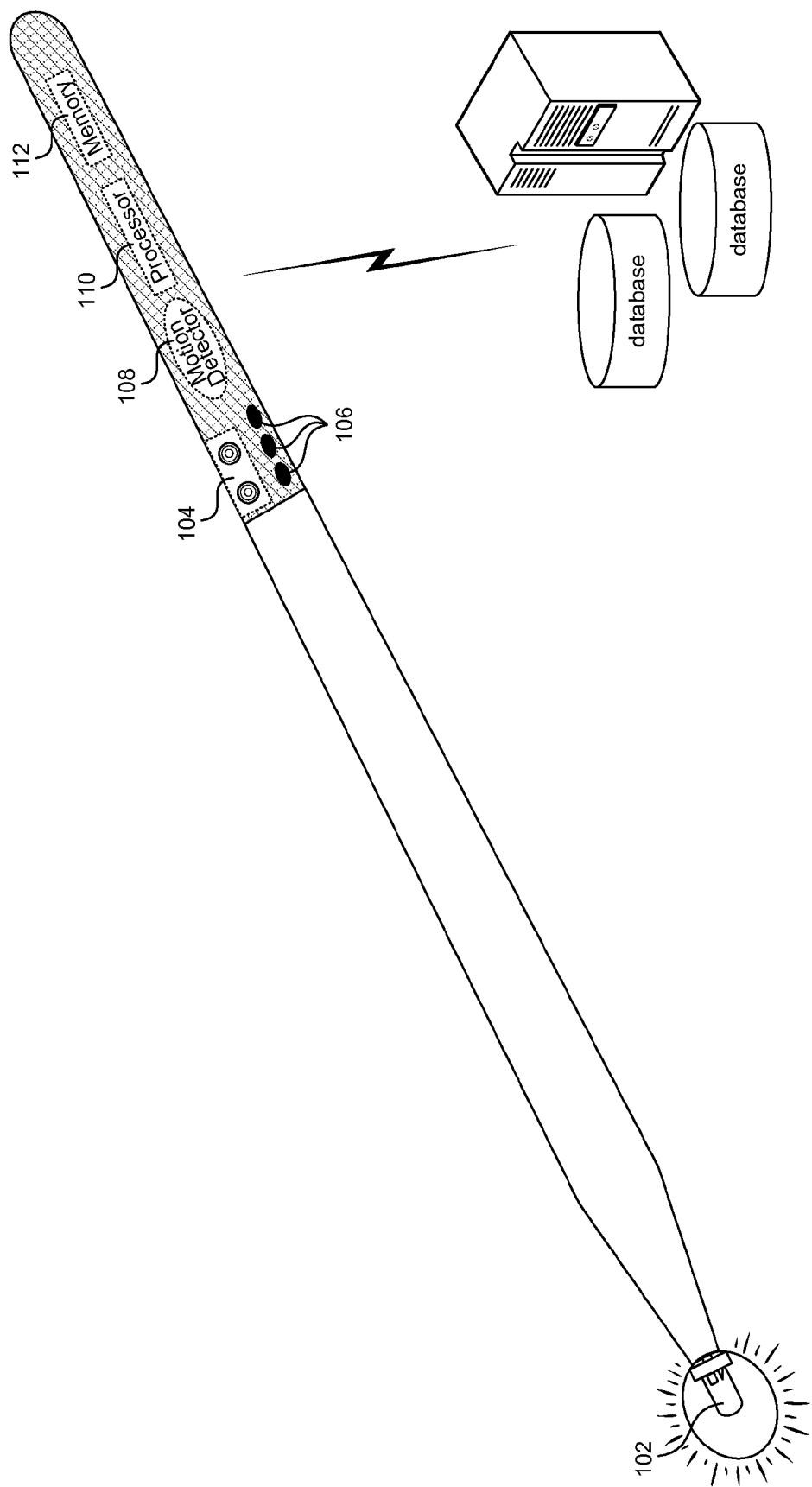
FIG. 1 illustrates an example drumstick disclosed in the present application.

FIG. 1 illustrates an example drumstick disclosed in the present application. In some embodiments, the drumstick has a translucent or semi-translucent tip, a shoulder, a shaft, and a base. Materials may include plastics, synthetics, wood, rubber, silicone, or other solid material. The drumstick may include a processor and hardware within the drumstick. A cover or grip may be included to form a handle. One or more input buttons may be associated with the cover or grip.

In some embodiments, a part of the drumstick, such as the tip, shoulder, or shaft (which can be wholly or partially made of a translucent material), contains a lighting display 102, such as a light emitting diode (LED). The lighting display 102 illuminates in various colors and various display patterns, such as flashing sequences, held illumination, etc., to represent different types of motion of the drumstick, which typically correspond to different drum strokes (e.g., full/down/up/tab stroke, double stroke, multiple strokes, etc.) on different drum elements (e.g., high/middle/floor tom, hi-hat/crash/ride cymbal, base/snare drum, etc.). The different light signals can be predetermined or chosen by a user. For example, the lighting display 102 can illuminate in a specific color to represent a specific type of motion, and it can also illuminate that specific color in a specific pattern, such as highlighting multiple bars, to indicate a specific note value (whole, half, quarter, eighth, sixteenth, etc.).

In some embodiments, a part of the drumstick, such as the shaft, shoulder, or base contains a motion detector 108, such as a nine-axis inertia measurement unit (IMU). The motion detector 108 is capable of detecting and capturing the movements of the drumstick, in terms of displacements, directions, speeds, accelerations, etc. The movements of the drumstick are generally interpreted as drum strokes on drum elements and can be translated into lights or sounds. Given positions of striking surfaces of the various drum elements, a complete series of movements can be defined for each combination of a drum stroke and a drum element, and the motion detector 108 can determine whether a series of movements of the drumstick matches a predefined series. The positions of the striking surfaces can further be defined with respect to the user, to the floor, to a wall, or any other target that can be detected by the motion detector 108 or another component within the drumstick. For example, a full stroke begins with the tip of the drumstick held 8-12" above the striking surface; the drummer strikes the drum and then returns the stick to its original position. Therefore, a series of movements where the tip of the drumstick starts at 8-12" above a given striking surface of a middle tom, drops 8-12", and returns to the starting position would be deemed by the motion detector 108 as a full stroke on a middle tom.

In some embodiments, a part of the drumstick, such as the shaft, shoulder, or base includes a processor 110 and a memory 112 for managing the operation of various elements of the drumstick (e.g., the lighting display 102 and the motion detector 108 as further discussed below). The processor 110 can include a network interface for communicating with other devices. The network interface can support any type of known network, such as a LAN, a cellular network, or a short-range wireless network. Part of the functionality of the processor 110 and memory 112 can be incorporated into an external device, to which the processor 110 would then communicate via the network interface.

In some embodiments, the drumstick can include a speaker 104 for playing drumbeats or plain music, such as human voices or sounds of other musical instruments. In addition, the drumstick can include operable controls 106, such as buttons or a touch screen, for a user to control operation of various elements of the drumstick, including communication with other devices. For example, the operable controls 106 can be used to start/stop operation of any of the elements of the drumstick or the communication with external devices. The communication with other devices, including other musical instruments, can be made in accordance with the music instrument digital interface (MIDI), for example. The speaker 104 or the operable controls 106 could instead be incorporated into an external system.

In some embodiments, the drumstick is used in two modes: learning and playing. In the learning mode, the drumstick helps a user learn how to play drums through light signals or other means, such a vibration or auditory signals. The drumstick can provide the user with visual, audio, or other types of feedback on the user's learning progress. In the playing mode, the drumstick embodies a user's drum playing in terms of light signals, drumbeats, etc. The drumstick also enables the user to play cooperatively by playing along songs or music made by other musical instruments.

In some embodiments, multiple drumsticks can be used simultaneously. For example, two drumsticks can function together in a coordinated fashion the same as they would on actual drums, according to a single drum transcription. The operation would include the detection of motion, the display of light signals, and the playing of drumbeats.

Figure 2:
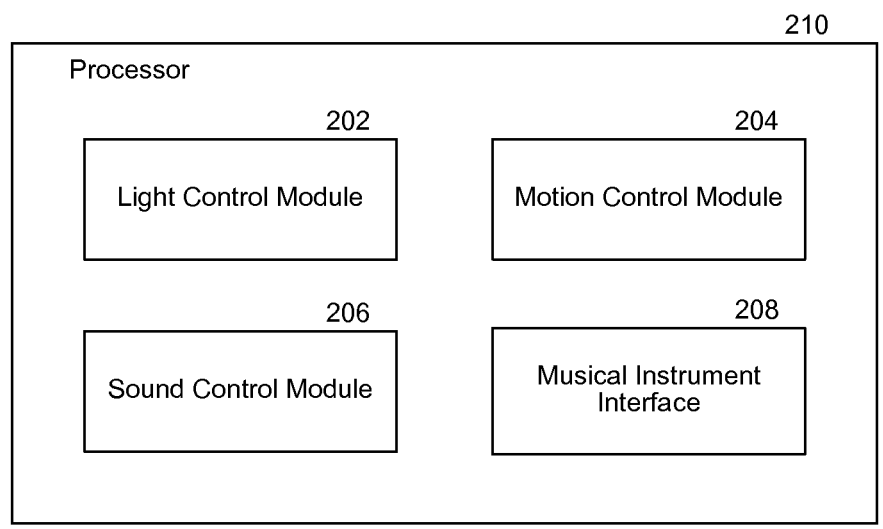
FIG. 2 illustrates examples components of the processor embedded in the drumstick.

FIG. 2 illustrates examples components of the processor embedded in the drumstick. In some embodiments, the processor includes a light control module 202, a motion control module 204, a sound control module 206, and a musical instrument interface 208. The light control module 202 manages operation of the lighting display in the drumstick, and the motion control module 204 manages operation of the motion detector in the drumstick. The sound control module 206 manages operation of a speaker that may be in the drumstick, and the musical instrument interface 208 manages operation of a musical instrument interface that may be in the drumstick. Some of the components can be migrated from the processor in the drumstick to an external system.

In some embodiments, the processor manages relationships between the light signals and types of motion. One of the methods would be to maintain a correspondence between light signals and types of motion, which can be expressed in terms of combinations of drum stokes and drum elements. For example, a red color can correspond to a tap on a hi-hat cymbal, or a display of four bars of the same color at once can correspond to a quarter note value. A user of the drumstick would be aware of the correspondence between light signals and types of motion as well as the ways of displaying light signals when using the drumstick in the intended fashion. Some of the above-described functionality can be performed by an external system instead.

Figure 3A:
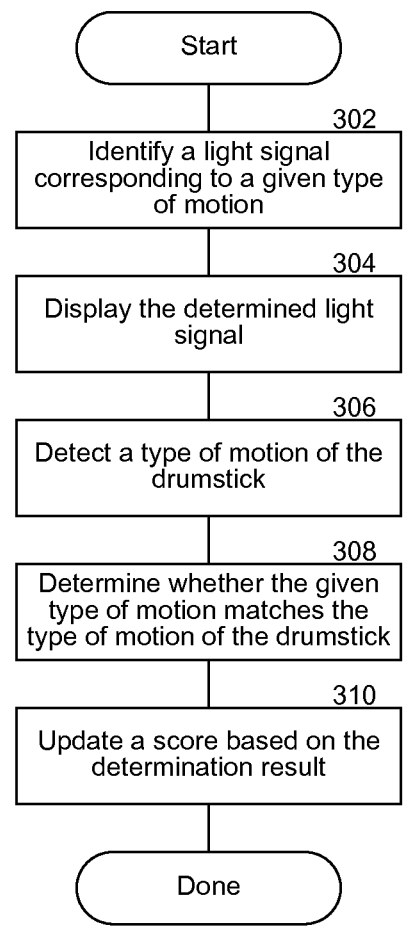
FIG. 3A illustrates an example process performed by the drumstick in a learning mode.

FIG. 3A illustrates an example process performed by the drumstick in the learning mode. In some embodiments, given a series of types of motion, the processor determines a corresponding series of light signals and sends the series of light signals to the lighting display. The types of motion can come from a drum transcription that is locally stored or received from an external device. They can also originate from MIDI commands transmitted directly from another musical instrument or through a MIDI controller. At step 302, based on certain content of a drum transcription or a MIDI command, the processor identifies a type of motion as necessary and determines the corresponding light signal. At step 304, the lighting display then displays the determined light signal. In response to a light signal presented by the lighting display, a user is expected to move the drumstick. At step 306, the motion detector detects the type of motion of the drumstick.

In some embodiments, at step 308, the processor compares the type of motion of the drumstick to the original type of motion corresponding to the displayed light signal to assess how well the user is learning. When the type of motion of the drumstick matches the original type of motion, it would be deemed correct; otherwise, it would be deemed incorrect. To track the user's progress and provide the user with appropriate feedback, at step 310, the processor updates a score depending on whether the type of motion of the drumstick is deemed correct or incorrect. The user can also specify the type of feedback to receive. For example, one type of feedback is immediate, where the processor can instruct the lighting display to redisplay the same color in a higher intensity when the type of motion of the drumstick is deemed incorrect. Another type of feedback is delayed, where the processor would display the series of light signals without interruption and indicate the user's progress with the drumstick only at the end.

In some embodiments, audio can be incorporated into the learning process in addition to the light signals. The user can choose to hear one or both of the drumbeat corresponding to the original type of motion and the drumbeat corresponding to the type of motion of the drumstick. In either case, the processor would translate a type of motion into a drumbeat when possible, and the speaker would play the drumbeat.

Figure 3B:
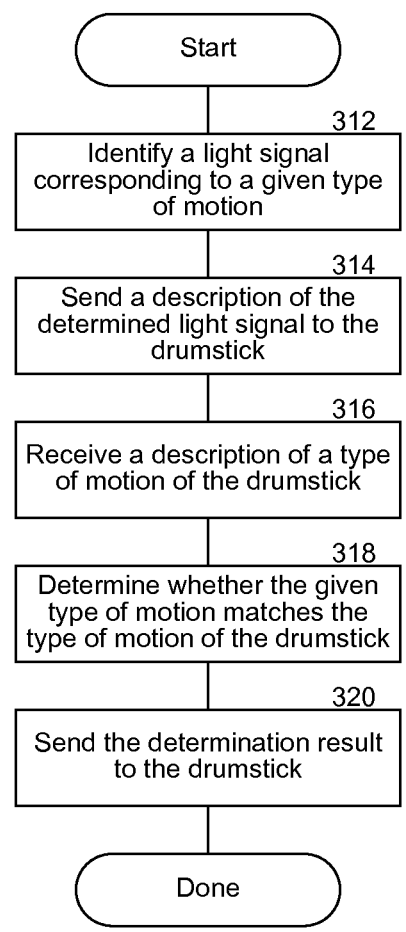
FIG. 3B illustrates an example process performed by an external system that includes a processor and a memory, and that interacts with the drumstick in the learning mode.

Some of the components and functions can be transferred from the drumstick to an external system. FIG. 3B illustrates an example process performed by such an external system that includes a processor and a memory, and which interacts with the drumstick in the learning mode. The external system can also maintain the relationships between light signals and types of motion. At step 312, for a given type of motion, which may originate from a drum transcription, a MIDI command, etc., the system identifies a corresponding light signal. At step 314, the system communicates a description of the determined light signal to the drumstick through a wired connection or a network interface, such as one for a short-range wireless network. In response, the drumstick would display the light signal and a user would attempt to replicate the given type of motion.

At step 316, the system receives a description of the type of motion of the drumstick from the drumstick through one of the interfaces. The description can detail a series of movements or can include a mere index of a particular combination of a drum stroke and a drum element, for example. At step 318, the system determines whether the given type of motion matches the type of motion of the drumstick, and thus whether the user has moved the drumstick the correct way in response to the instructing light signal. At step 320, the system sends the determination result or the user's progress report to the drumstick, which can then provide the feedback to the user. The system can also directly show the determination to the user through a display device.

Figure 4A:
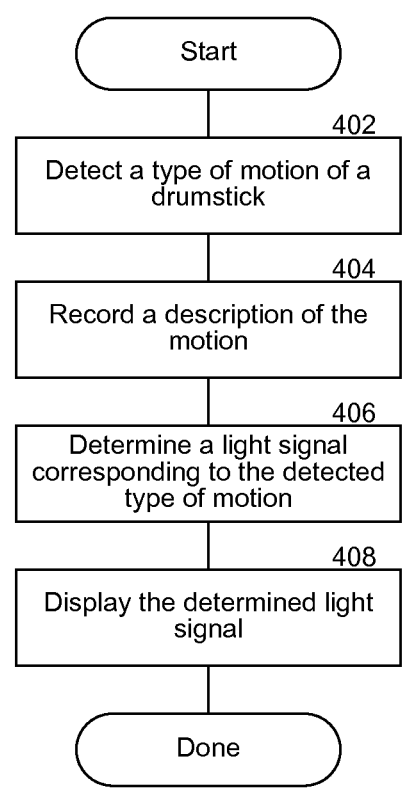
FIG. 4A illustrates an example process performed by the drumstick in a playing mode.

FIG. 4A illustrates an example process performed by the drumstick in the playing mode. In some embodiments, a user moves the drumstick to play air drums. At step 402, the motion detector detects a type of motion of the drumstick. At step 404, the processor stores a description of the detected type of motion in the memory for subsequent use. At step 406, the processor determines a light signal corresponding to the detected type of motion. The processor can also record a description of the corresponding light signal instead of or in conjunction with the description of the detected type of motion. At 408, the lighting display then displays the determined light signal. In this way, a user can see a light show corresponding to the user's drum play.

In some embodiments, a series of types of motion detected in the playing mode can be treated as a set of drumming instructions, similar to a drum transcription, and can then be used later in the learning mode. For example, a teacher may record a set of combinations of drum strokes and drum elements in the playing mode, and a student may learn that set of combinations in the learning mode through a set of corresponding light signals. For a type of motion, the processor can also generate a MIDI command and transmit the generated MIDI command to another musical instrument or a MIDI controller, to enable the user to contribute drumbeats to a playing band, for example.

In some embodiments, audio can be incorporated into the playing process in addition to lighting. The processor would translate the detected type of motion into a drumbeat when possible, and the speaker would play the drumbeat. A user can also choose to listen to music along which to play the drums. The speaker can then play the chosen music. When the user plays with a band in real time, the processor can translate MIDI commands into sounds of appropriate instruments, and the speaker would play the resulting sounds, to enable the user to hear the music of the entire band.

Figure 4B:
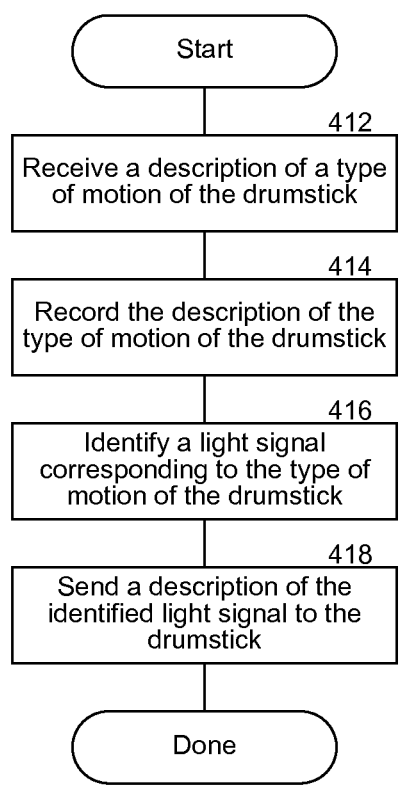
FIG. 4B illustrates an example process performed by an external system that includes a processor and a memory, and that interacts with the drumstick in the playing mode.

Some of the components and functions can be transferred from the drumstick to an external system. FIG. 4B illustrates an example process performed by such an external system that includes a processor and a memory, and which interacts with the drumstick in the playing mode. The external system can also maintain the relationships between light signals and types of motion. Initially, a user moves the drumstick to simulate drum playing. At step 412, the system receives a description of a type of motion of the drumstick from the drumstick through a wired connection or a network interface. At step 414, the system records the description for future use. For example, consecutive descriptions can be assembled into a drum transcription for use in the learning mode. At step 416, the system identifies a light signal corresponding to the type of motion of the drumstick. At step 418, the system communicates a description of the identified light signal to the drumstick through one of the interfaces, so that the drumstick can provide a response to the type of motion of the drumstick. The system can also provide feedback directly, such as a drumbeat corresponding to the type of motion of the drumstick through a speaker component.

Figure 5:
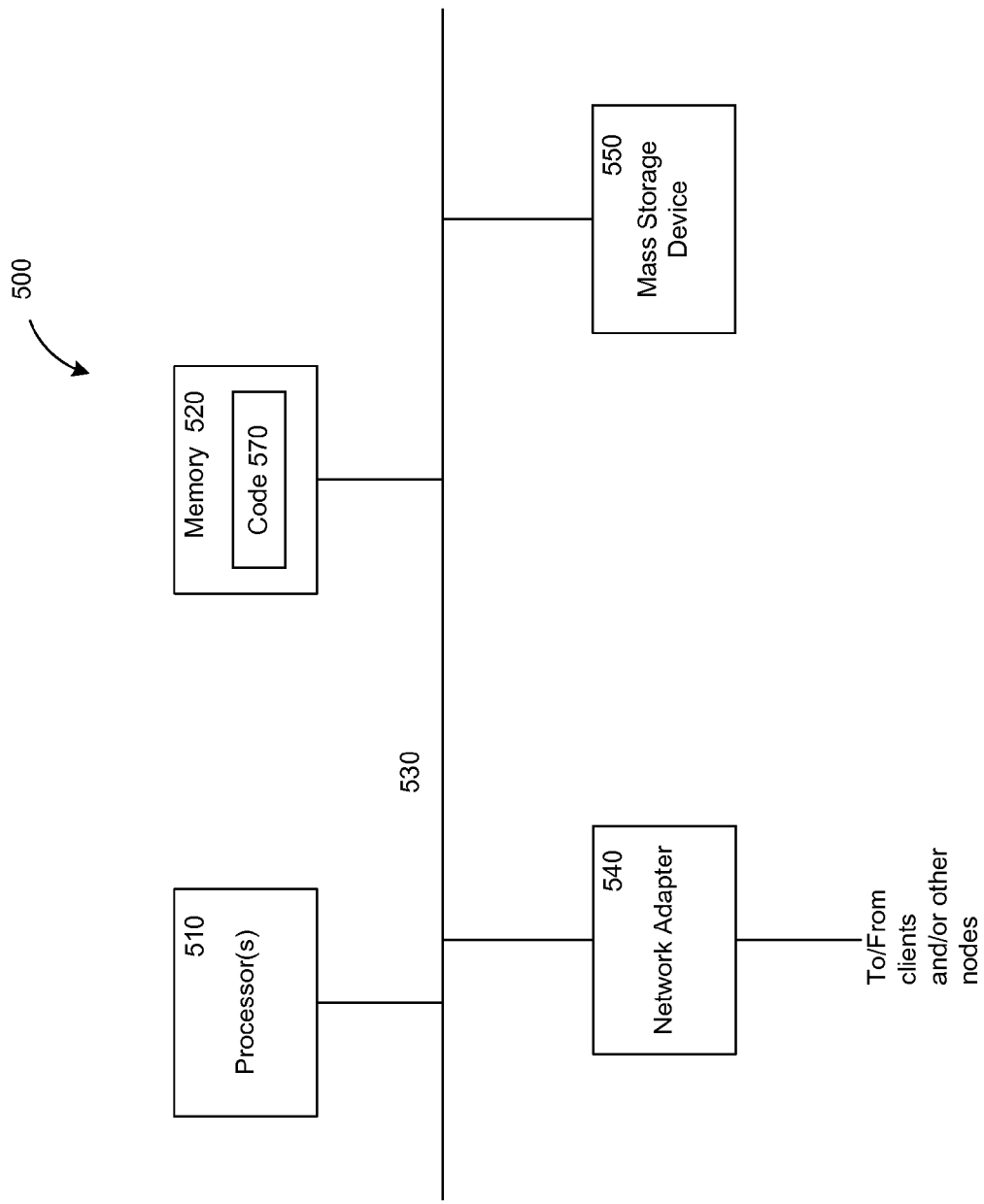
FIG. 5 is a high-level block diagram showing an example architecture of a computer, which may represent any electronic device, any server, or any node within a cloud service as described herein.

FIG. 5 contains a high-level block diagram showing an example architecture of a computer 500, which may represent any electronic device, such as a mobile device or a server, including any node within a cloud service as described herein, and which may implement the operations described above.

The computer 500 includes one or more processors 510 and memory 520 coupled to an interconnect 530. The interconnect 530 shown in FIG. 5 is an abstraction that represents any one or more separate physical buses, point to point connections, or both connected by appropriate bridges, adapters, or controllers. The interconnect 530, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 510 is/are the central processing unit (CPU) of the computer 500 and, thus, control the overall operation of the computer 500. In certain embodiments, the processor(s) 510 accomplish this by executing software or firmware stored in memory 520. The processor(s) 510 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices.

The memory 520 is or includes the main memory of the computer 500. The memory 520 represents any form of random access memory (RAM), read-only memory (ROM), flash memory, or the like, or a combination of such devices. In use, the memory 520 may contain code 570 containing instructions according to the techniques disclosed herein.

Also connected to the processor(s) 510 through the interconnect 530 are a network adapter 540 and a mass storage device 550. The network adapter 540 provides the computer 500 with the ability to communicate with remote devices over a network and may be, for example, an Ethernet adapter. The network adapter 540 may also provide the computer 500 with the ability to communicate with other computers.

The code 570 stored in memory 520 may be implemented as software and/or firmware to program the processor(s) 510 to carry out actions described above. In certain embodiments, such software or firmware may be initially provided to the computer 500 by downloading it from a remote system through the computer 500 (e.g., via network adapter 540).

In yet another example embodiment of the invention, the drumstick comprises a tip, a shaft and a removable base portion. The tip and/or shaft include translucent material in portions thereof to facilitate LED light displays. The LED light displays are connected to the removable base portion, which includes a power source or battery and electronic circuitry as described. The removable base portion can be programmed for various functional modules, for example, light sequences reactive to the musician playing the drumstick, light sequences reactive to music played from an external source, a MIDI interface, or other modules. The removable base portion can included user input buttons to activate the drumsticks and interact with various program functions. The removable base portion can also be replaced with a non-interactive base portion, which would allow the musician to use the drumstick as an ordinary drumstick.

CONCLUSION

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

These computer program instructions may also be stored in a computer readable medium that can direct a computer, other programmable data processing apparatus, or other devices to function in a particular manner, such that the instructions stored in the computer readable medium produce an object of manufacture including instructions which implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

I claim:

1. A device having a drumstick shape, comprising:
a lighting display;
a motion detector, and
a processor,
wherein the motion detector detects a type of motion of the device,
wherein the processor determines the light signal corresponding to the detected type of motion, and
wherein the lighting display shows the determined light signal;
wherein the motion detector detects a plurality of types of motion of the device, and
wherein the lighting display shows a plurality of light signals respectively corresponding to the plurality of types of motion.

2. The device of claim 1, further comprising:
a memory,
wherein the processor and the memory maintain a correspondence between the plurality of types of motion and the plurality of light signals.

3. The device of claim 1, further comprising a speaker that transmits a plurality of drumbeats respectively corresponding to the plurality types of motion.

4. The device of claim 3, wherein the speaker further transmits music, including a human voice or an instrumental sound.

5. The device of claim 1, wherein the lighting display is a light emitting diode (LED) display located in a portion of the device corresponding to a tip of the drumstick.

6. The device of claim 1, wherein the motion detector includes a nine-axis inertia measurement unit (IMU).

7. The device of claim 1, wherein a type of motion includes a set of displacements, directions, speeds, or accelerations.

8. The device of claim 1, wherein a type of motion corresponds to a drum stroke on a drum element.

9. The device of claim 1, wherein a portion of the device corresponding to a shaft of the drumstick is covered with a metal grip.

10. The device of claim 1, further comprising,
wherein the processor determines a light signal corresponding to a given type of motion,
wherein the lighting display shows the determined light signal,
wherein the motion detector detects a type of motion after the showing, and
wherein the processor determines whether the given type of motion matches the detected type of motion.

11. The device of claim 10, further comprising
a memory,
wherein the processor records the detected type of motion into the memory.

12. The device of claim 2,
wherein the motion detector detects a type of motion of the device,
wherein the processor determines a drumbeat corresponding to the detected type of motion, and
wherein the speaker plays the determined drumbeat.

13. The device of claim 2,
wherein the processor receives a MIDI command through a network interface,
wherein the processor generates an instrumental sound for the MIDI command, and
wherein the speaker plays the instrumental sound.

14. The device of claim 1, further comprising
one or more operable controls,
wherein one of the operable controls causes transmission of a music instrument digital interface (MIDI) command to another device via a network interface.

15. The device of claim 1, further comprising
wherein the motion detector detects a type of motion of the device,
wherein the processor generates a MIDI command for a detected type of motion, and
wherein the processor transmits the generated MIDI command to another device via a network interface.

16. The device of claim 14,
wherein the one or more operable controls are buttons, and
wherein the network interface is a short-range wireless interface or a wired interface.

17. A method of operating a device having a drumstick shape comprising a lighting display and a motion detector, and a processor, the method comprising:
displaying, by the lighting display, a light signal corresponding to a first type of motion;
detecting, by the motion detector, a second type of motion of the device after the displaying;
determining, by the processor, whether the first type of motion matches the second type of motion corresponding to the displayed light signal; and
updating, by the processor, a score based on the determination result.

18. The method of claim 17,
wherein the device further includes a speaker, the method further comprising
determining, by the processor, a drumbeat corresponding to the second type of motion; and
playing, by the speaker, the determined drumbeat.

19. The method of claim 17,
wherein the device further includes a memory, the method further comprising
determining, by the processor, the first type of motion before the displaying based on a drum transcription stored in the memory.

20. The method of claim 17, further comprising:
receiving, by the processor, a drum transcription from another device through a network interface; and
determining, by the processor, the type of motion before the displaying based on the received drum transcription.

21. A method of operating a device of having drumstick shape comprising a lighting display a motion detector, and a processor, the method comprising:
detecting, by the motion detector, a type of motion of the device;
determining, by the processor, a light signal corresponding to the detected type of motion;
displaying, by the lighting display, the determined light signal; and
recording, by the processor, a description of the detected type of motion.

22. The method of claim 21,
wherein the device further includes a speaker, the method further comprising:
determining, by the processor, a drumbeat corresponding to the detected type of motion;
transmitting, by the speaker, the determined drumbeat; and
recording, by the processor, a description of the drumbeat.

23. The method of claim 21, further comprising:
translating, by the processor, the detected type of motion into a drum stroke on a drum element;
generating, by the processor, a MIDI command related to the drum stroke and the drum element; and
transmitting, by the processor, the generated MIDI command to another device.

* * * * *